United States Patent [19]

Suzuki et al.

[11] Patent Number: 4,905,091
[45] Date of Patent: Feb. 27, 1990

[54] RECORDING DATA PROCESSOR

[75] Inventors: Masayoshi Suzuki, Yokohama; Hisao Urata, Tokyo; Satoshi Egawa, Kawasaki; Shigeru Ueda, Wako, all of Japan

[73] Assignee: Canon Kabushiki Kaisha, Tokyo, Japan

[21] Appl. No.: 262,823

[22] Filed: Oct. 26, 1988

[30] Foreign Application Priority Data

Oct. 29, 1987 [JP] Japan .................................. 62-271617

[51] Int. Cl.4 ......................... H04N 1/21; H04N 1/46; G03G 15/01
[52] U.S. Cl. .................................... 358/296; 346/157; 358/460; 358/78
[58] Field of Search .................... 358/75, 78, 296, 460; 346/157

[56] References Cited

FOREIGN PATENT DOCUMENTS 2165678 4/1986 United Kingdom .................. 358/78

Primary Examiner—Bruce A. Reynolds
Assistant Examiner—Scott A. Rogers
Attorney, Agent, or Firm—Fitzpatrick, Cella, Harper & Scinto

[57] ABSTRACT

A recording data processor comprises a first bit map memory for storing recording data, a second bit map memory for storing color data representing a reproduction color of the recording data stored in the first bit map memory, for each recording data, and a generation circuit for generating recording data for each color based on the recording data fetched from the first bit map memory and the color data fetched from the second bit map memory.

21 Claims, 5 Drawing Sheets

PRIOR ART

FIG. 5

PRIOR ART

FIG. 6

PRIOR ART

RECORDING DATA PROCESSOR

BACKGROUND OF THE INVENTION

1. Field of the Invention

The present invention relates to a recording data processor for processing recording data for image recording.

2. Related Background Art

Figure 4:
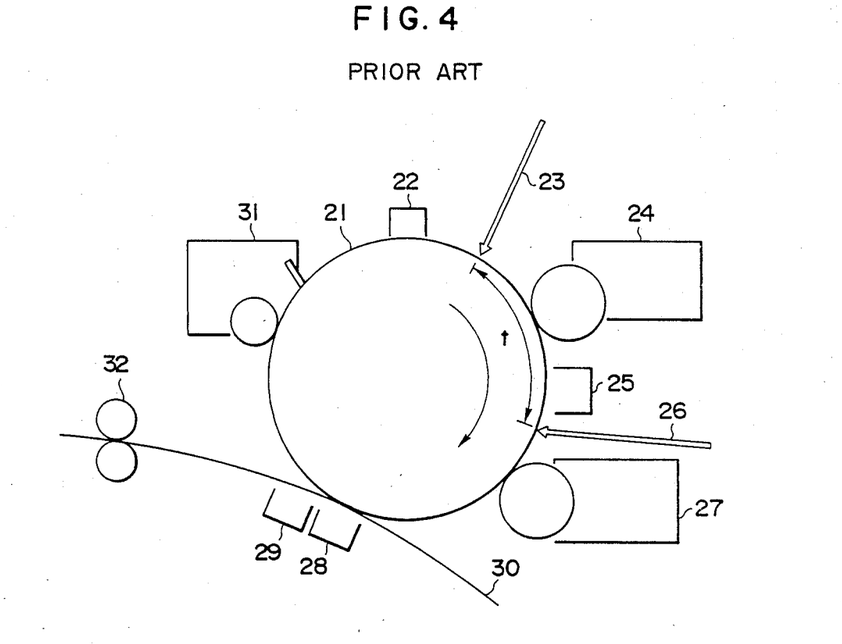
FIG. 4 shows a sectional view of a two-color laser beam printer capable of multi-color printing.

In a conventional processor of this type, input multicolor print information is analyzed and converted to print dot data of the respective colors which is supplied to a multicolor printer such as a two-color laser beam printer shown in FIG. 4.

FIG. 4 shows a sectional view of a two-color laser beam printer capable of multicolor printing. Numeral 21 denotes a photo-sensitive drum which is rotated in the direction of arrow A at a constant speed, numeral 22 denotes a primary charger for uniformly charging a surface potential of the photo-sensitive drum 21, numeral 23 denotes a primary exposure beam which is on/off modulated by red print dot data of input multicolor print information and scans the photo-sensitive drum 21 to form an electrostatic latent image corresponding to red dots and, numeral 24 denotes a red developer which develops the electrostatic latent image formed on the photo-sensitive drum 21 by red toner. Numeral 25 denotes a secondary charger which uniformly charges the surface potential of the photo-sensitive drum 21 to a secondary charge level after the primary development process, numeral 26 denotes a secondary exposure beam which is on/off modulated by black print dot data in the input multicolor print information and scans the photo-sensitive drum 21 to form an electrostatic latent image corresponding to black dots, and numeral 27 denotes a black developer which develops the black electrostatic latent image formed on the photo-sensitive drum 21 by black toner, numeral 28 denotes a transfer charger which transfers the developed black toner and red toner to a record sheet 30, and numeral 29 denotes a separation charger which separates the record sheet 30 fed from the transfer process from the photo-sensitive drum 21. Numeral 31 denotes a cleaner which collects toners of the respective colors remaining on the photo-sensitive drum 21 after the image formation process and cleans the surface of the photo-sensitive drum 21, and numeral 32 denotes a fixing unit which applies heat and pressure to the toners of the respective colors on the record sheet 30 at the end of the transfer process to fix the toners of the respective colors onto the record sheet 30.

The multicolor print process is similar to a known electrophotographic process and hence detail thereof is omitted. It is processed in the order of primary charge, primary exposure, primary development, secondary charge, secondary exposure, secondary development, transfer, separation and fixing.

Figure 5:
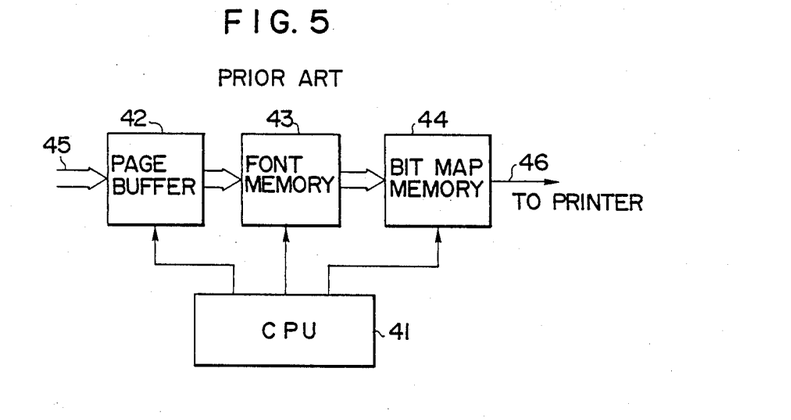
FIG. 5 shows a control block diagram of a prior art multi-color print data control unit.

FIG. 5 shows a block diagram of a prior art multicolor print data control unit. Numeral 41 denotes a CPU which collectively processes the input multicolor print information. Numeral 42 denotes a page buffer which stores one page of the input multicolor print information (print control code, print character code, etc.)45. Numeral 43 denotes a font memory which stores a font pattern for each print character code, which is to be converted to a print dot pattern corresponding to the print character code stored in the page buffer 42. Numeral 44 denotes a bit map memory which stores one page of print dot pattern and sequentially supplies it to a printer (not shown) as serial data 46 in accordance with the print status of the printer under control of a CPU 41.

Figure 6:
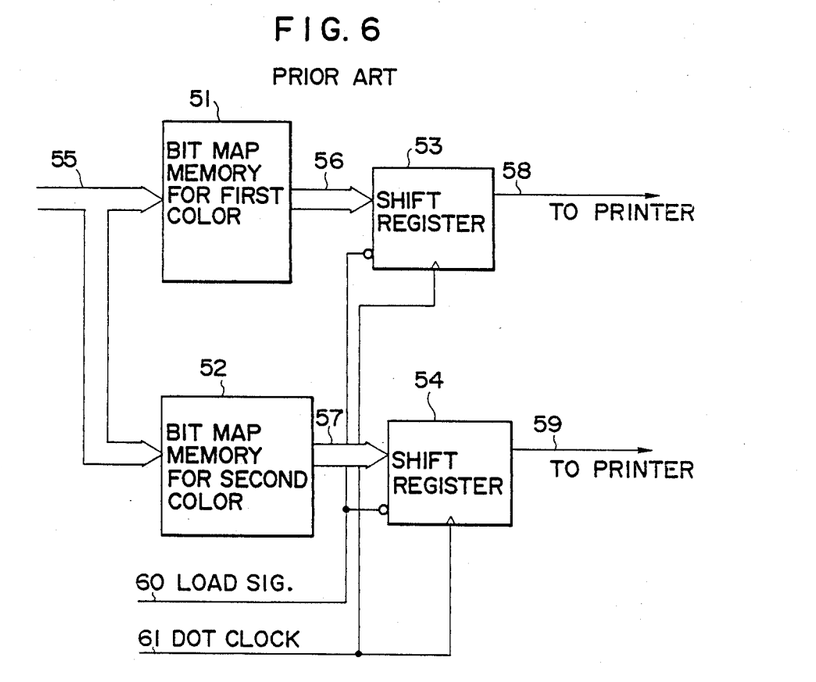
FIG. 6 shows a block diagram of a bit map memory of FIG. 5.

FIG. 6 shows a configuration of the bit map memory 44 shown in FIG. 5. Numeral 51 denotes a bit map memory for a first color. It stores one page of bit map of, for example, red print data of the multicolor dot pattern data 55. Numeral 52 denotes a bit map memory for a second color. It stores one page of bit map of, for example, black print dot data in the multicolor dot pattern data 55. Numeral 53 denotes a shift register which converts red parallel dot pattern data 56 read from the first color bit map memory 51 to serial red print dot data 58 in accordance with a load signal 60 and a dot clock 61 supplied from the CPU 61 and supplies it to the printer. Numeral 54 denotes a shift register which converts the black parallel dot pattern data 57 read from the second color bit map memory 52 to serial black print dot data 59 in accordance with the load signal 60 and the dot clock 61 supplied from the CPU 41.

When the CPU 41 receives the multicolor print information 45, it stores one page of the analyzed print character code in the page buffer 42. Then, it refers the font patterns corresponding to the print character codes stored in the font memory 43 and converts the input print character code to the multicolor dot pattern data 55 and develops one page thereof into the bit map memory 44. The print dot pattern data corresponding to the first color is developed into one page of the first color bit map memory 51, and the print dot pattern data corresponding to the second color is developed into one page of the second color bit map memory 52. Then, the red parallel dot pattern data 56 developed into the first color bit map memory 51 is transferred to the succeeding stage shift register 53 in synchronism with the load signal 60 and the dot clock 61 supplied from the CPU 41, and the parallel data is converted to the serial red print dot data 58 and is transferred to the printer. With a predetermined time difference, the black parallel dot pattern data 57 developed into the second color bit map memory 52 is transferred to the succeeding stage shift register 54 in synchronism with the load signal 60 and the dot clock 61 supplied from the CPU 41 and the parallel data is converted to the serial black print dot data 59 and it is transferred to the printer. In accordance therewith, the primary exposure beam 23 and the secondary exposure beam 26 shown in FIG. 4 are emitted from a semiconductor laser (not shown) so that the electrostatic latent images of the respective colors are formed on the photoconductor drum 21. In this manner, the multi-color image is developed with the toners of respective colors.

Since the multi-color dot pattern data 55 is independently developed into the bit map memories of the respective colors, that is, the first color bit map memory 51 and the second color bit map memory 52, if the print dots are set at the same address, the red and black dots are mixedly developed at the same position on the photoconductor drum 21 and desired multicolor printing is not attained, but instead a low grade mixed color printing is attained.

In order to resolve the above problems, Japanese Patent Laid-open No. 62-81669 (laid open on Apr. 15, 1987) and Japanese Patent Laid-open No. 62-230160 (laid open on Oct. 8, 1987) were proposed but further improvement has been desired.

SUMMARY OF THE INVENTION

It is an object of the present invention to solve the above problem.

It is another object of the present invention to provide a recording data processor which assures a high quality reproduced image.

It is another object of the present invention to improve the recording data processor.

It is another object of the present invention to provide a recording data processor which avoids overlap-recording for each color.

It is another object of the present invention to provide a recording data processor which produces a high grade output image with a simple construction.

It is another object of the present invention to provide a recording data processor which prevents color mixing when a multi-color image is reproduced.

Other objects of the present invention will be apparent from the following description and the appended claims.

DETAILED DESCRIPTION OF THE PREFERRED EMBODIMENTS

Embodiments of the present invention will be explained in detail with reference to the accompanying drawings.

Figure 1:
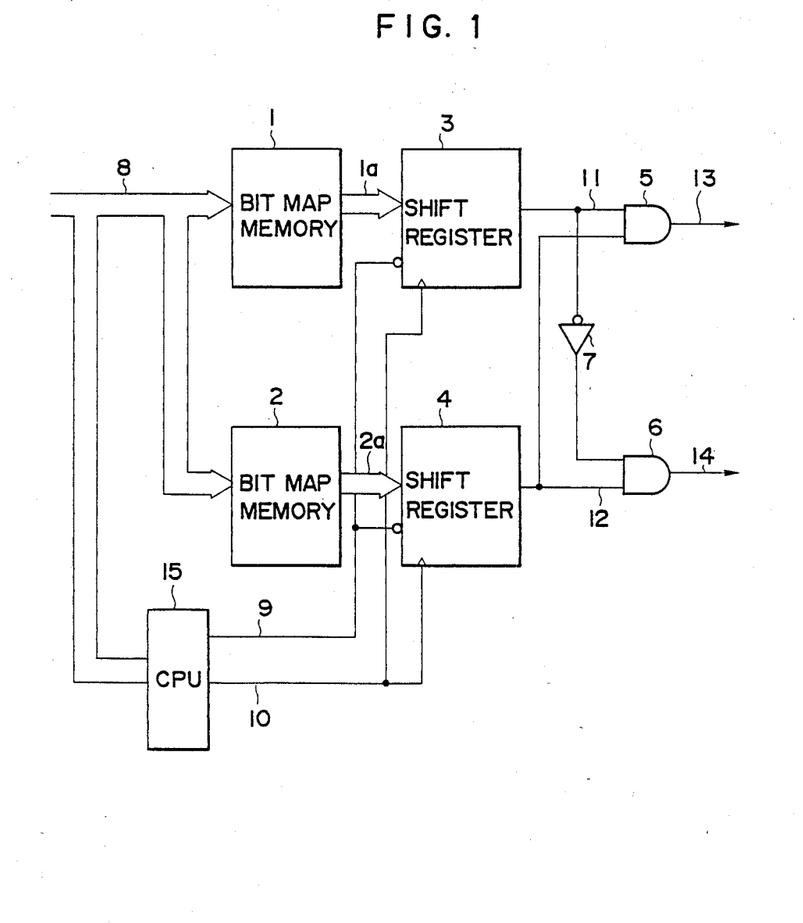
FIG. 1 shows a block diagram of one embodiment of a recording data processor of the present invention.

FIG. 1 shows a block diagram of one embodiment of a multi-color print data control unit of the present invention. Numeral 1 denotes a bit map memory of print color attribute information storage means. It stores one page of bit map of print color attribute information of each color which is prepared by a CPU 15 which functions as print color attribute information generation means by analyzing the input multi-color print information. Numeral 2 denotes a bit map memory of the print dot information storage means. It stores one page of bit map of the print dot information prepared by the CPU 15 by analyzing the input multicolor print information. Numeral 3 denotes a shift register which converts the print attribute dot data 1a (parallel signal) (when it is "1", it indicates that the print dot color is red, and when it is "0", it indicates that the print dot color is black), which is transferred from the bit map memory 1 in accordance with the load signal 9 and the dot clock 10 supplied from the CPU 15, to the serial signal 11, and supplies it to an AND gate 6 through an AND gate 5 and an inverter gate 7. Numeral 4 denotes a shift register which converts the print dot data 2a (parallel data) (which is "1" when the dot is to be printed and "0" in the other case) transferred from the bit map memory 2 in accordance with the load signal 9 and the dot clock 10 supplied from the CPU 15, to the serial signal 12, and supplies it to the AND gates 5 and 6.

The AND gate 5 logically ANDs the input serial signal 11 and serial signal 12 and transfers the red print dot data 13 to a laser unit of the printer. The AND gates 6 logically ANDs the inverted signal of the input serial signal 11 and the serial signal 12 and transfers the black print dot data 14 to the laser unit of the printer.

Numeral 8 denotes a bus which contains an address signal supplied from the CPU 15 to specify read addresses of the print color attribute information stored in the bit map memory 1 and the print dot information stored in the bit map memory 2. The print color attribute dot data and the print dot data stored in the bit map memories 1 and 2 correspond to each other dot by dot, and both dot data can be addressed by a common address.

The inverter gate 7 and the AND gates 5 and 6 constitute dot pattern data generation means which generates dot pattern data for each color in accordance with the print dot information stored in the bit map memories 1 and 2 and the print color attribute information.

Figure 2:
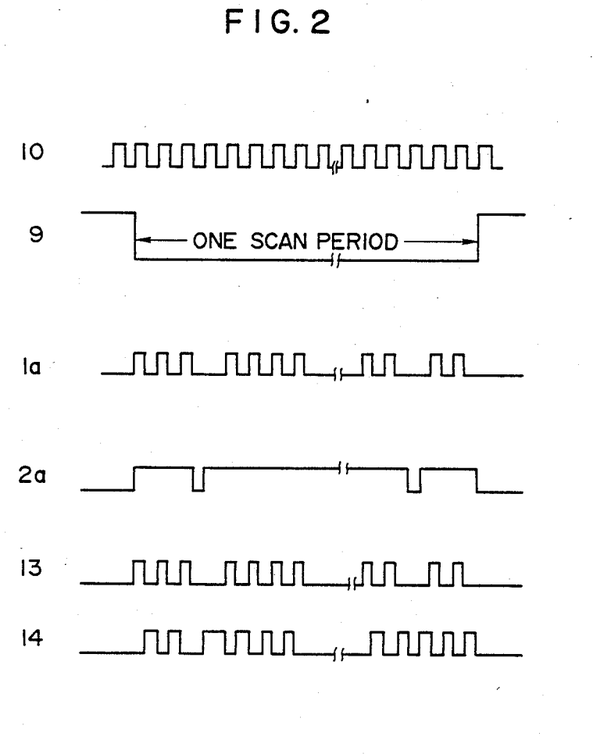
FIG. 2 shows a timing chart of the operation of FIG. 1.
Figure 3:
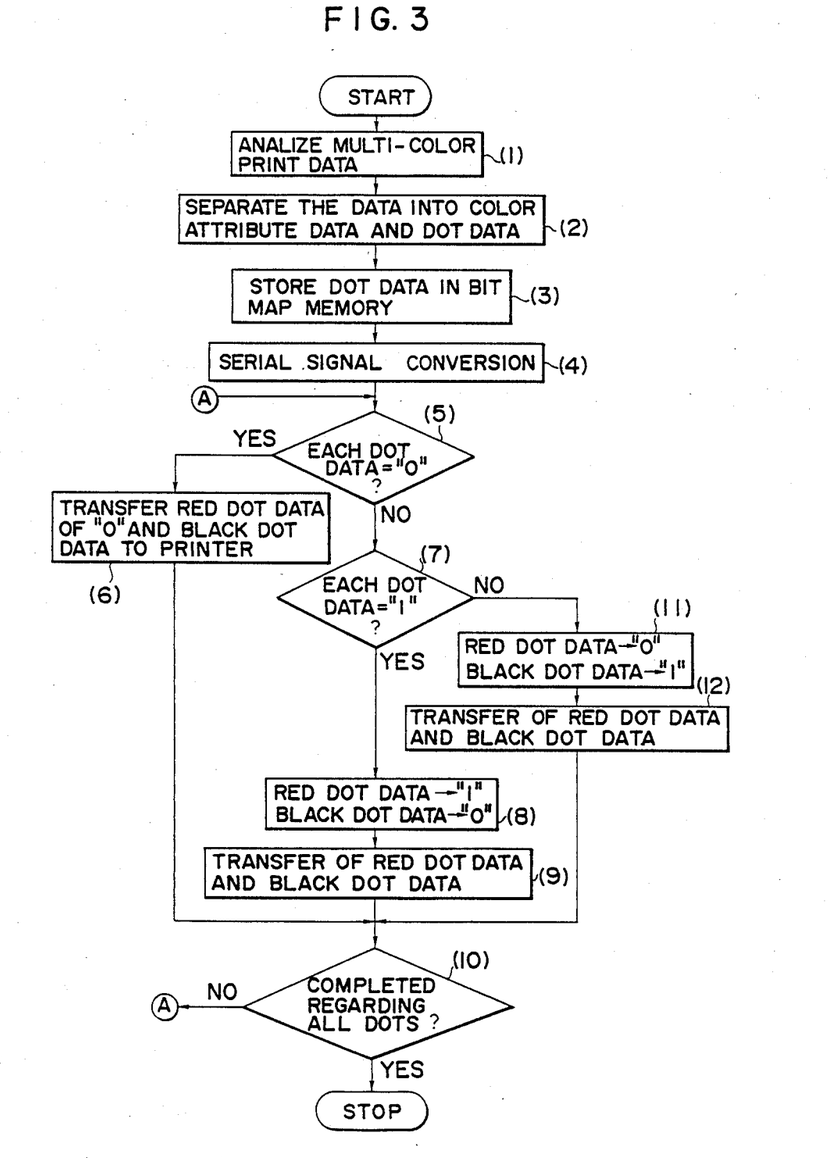
FIG. 3 shows a flow chart of a print data transfer control process.

Referring now to FIGS. 2 and 3, the multicolor print data transfer operation is explained.

FIG. 2 shows a timing chart for the circuit operation of FIG. 1. The like elements to those shown in FIG. 1 are designated by the like numerals.

The CPU 15 analyzes, the multi-color print character code data supplied from an upper level external unit (for example, a host computer) not shown, and separates it into the print color attribute information (which indicates whether the print dot is red or black) and the print dot information, develops the separated print color attribute information into the bit map memory 1, and develops the separated print dot information into the bit map memory 2. After a predetermined amount of dot pattern (for example, one page) has been developed into the bit map memories 1 and 2, respectively, the CPU 15 sends a common address signal 8 to the bit map memories 1 and 2, and sends the load signal 9 and the dot clock 10 to the shift registers 3 and 4. In response thereto, the parallel print color attribute dot data 1a stored in the bit map memory 1 is transferred to the shift register 3, and the parallel print dot data 2a stored in the bit map memory 2 is transferred to the shift register 4. Then, the shift register 3 supplies the serial signal 11 converted from the print color attribute dot data 1a to the AND gate 5 and the inverter gate 7.

In parallel thereto, the shift register 4 supplies the serial signal 12 converted from the print dot data 2a to the AND gates 5 and 6.

Accordingly, the AND gates 5 logically ANDs the serial signal 11 and the serial signal 12, and when both serial signals 11 and 12 are "1", it transfers the red print dot data 13 to the laser unit (for reproducing red) for driving the semiconductor laser in the printer (not shown), for example. In parallel with the above transfer, the AND gate 6 logically ANDs the inverted signal of the serial signal 11 and the serial signal 12, and when the serial signal from the inverter gate 7 and the serial signal 12 are both "1", it transfers the black print dot data 14 to the laser unit (for reproducing black) for driving the semiconductor laser in the printer, for example. When both the serial signals 11 and 12 are "1", the red print dot data 13 is "1" and the black print dot data 14 is "0" (see FIG. 2), and the mixing of the black dot and the red dot is prevented. Only when the serial signal 11 is "0" and the serial signal 12 is "1" is the black print dot data 14 "1".

Thus, it does not occur that the black print dot data 14 and the red print dot data 13 are simultaneously "1", and the mixing of toners of different colors on the same dot position, which has occurred in the prior art apparatus, is prevented.

Referring to the flow chart of FIG. 3, the print data transfer control operation is now explained.

FIG. 3 shows a flow chart for the print data transfer control process which comprises steps (1) to (12).

The CPU 15 analyzes the input multicolor print information (1), and prepares the print color attribute information (which indicates whether the print dot color is red or black) and the print dot information and separates those information (2). Then, it stores the separated print color attribute information into the bit map memory 1 and the separated print dot information into the bit map memory 2 (3).

Then, the parallel print color attribute dot data 1a and the print dot data 2a stored in the bit map memories 1 and 2 are converted to the serial signals 11 and 12 by the shift registers 3 and 4 (4). Whether the dot data of the serial signals 11 and 12 are "0" or not is checked (5), and if the decision is YES, the "0" red print dot data 13 and the "0" black print dot data 14 are transferred to the printer (6), and then the process proceeds to a step (10). If the decision is NO, whether the dot data 13 and 14 of the serial signals 11 and 12 are "1" or not is checked (7), and if the decision is NO, the process proceeds to a step (11). If the decision is YES, the red print dot data 13 is set to "1" and the black print dot data 14 is set to "0" (8), and the generated red print dot data 13 and black print dot data 14 are transferred to the printer (9) Whether the comparison of the print color attribute dot data 1a and the print dot data 2a developed into the bit map memories 1 and 2 has been completed for all dots or not is checked (10), and if the decision is YES, the process is terminated, and if the decision is NO, the process returns to the step (5).

On the other hand, if the decision in the step (7) is NO, the red print dot data 13 is set to "0" and the black print dot data 14 is set to "1" (11), and the generated red print dot data 13 and black print dot data 14 are transferred to the printer (12). Then the process returns to the step (10).

In the present embodiment, the multi-color print information includes two colors, red and black although the present invention is not limited thereto. Where one-dot information of the bit map memory 1 which stores the attribute information has two bits, the print dot data of up to four colors can be generated and transferred without mixing of colors. Similarly, where one-bit information of the bit map memory 2 has two bits, not only the on/off condition of the bit but also multi-level tone output can be attained. In the present embodiment, the dot pattern generation means comprises the AND gates 5 and 6, and the inverter 7. Alternatively, a selector may be provided to generate the dot pattern by a control signal from the CPU 15 in order to attain the same effect.

As shown in the flow chart of FIG. 3, the CPU 15 may process the outputs from the bit map memories 1 and 2 and send the red and black print bit data to the printer (engine).

When the circuit shown in FIG. 1 is applied to the laser beam printer shown in FIG. 4, it is necessary to delay the output of the AND gate 14 by a time period corresponding to the distance t.

The present invention is also applicable to a recorder other than the laser beam printer, for example, ink jet printer, LED printer or liquid crystal printer.

The present invention is not limited to the illustrated embodiments but various modifications may be made within the scope of the claims.

We claim:

1. A recording data processor comprising:
   first storage means for storing recording data;
   second storage means for storing color data representing reproduction color of the recording data stored in said storage means, for each of the recording data;
   generation means for generating the recording data for each color based on the recording data output from said first storage means and the color data output from said second storage means; and
   first and second shift registers for converting the parallel recording data and color data supplied from said first and second storage means to first and second serial signals, respectively.

2. A recording data processor according to claim 1, wherein said first and second storage means include first and second bit map memories, respectively.

3. A recording data processor according to claim 2, wherein said recording data is dot data, and at least one page of the dot data is stored in said first bit map memory.

4. A recording data processor according to claim 1, further comprising addressing means for specifying a common address to said first and second storage means.

5. A recording data processor according to claim 1, wherein said generation means includes a first recording data output unit for outputting recording data corresponding to a first color, and a second recording data output unit for outputting recording data corresponding to a second color.

6. A recording data processor according to claim 5, wherein said generation means comprises means for restricting the output of said first and second recording data so that first and second images formed on the basis of said first and second recording data respectively are not overlapped.

7. A recording data processor comprising:
   first storage means for storing dot data for recording;
   second storage means for storing color data representing a reproduction color of the dot data; and
   first and second recording data output means for outputting first recording data corresponding to a first color and second recording data corresponding to a second color, respectively, based on the dot data output from said first storage means and the color data output from the second storage means.

8. A recording data processor according to claim 2, wherein said first and second storage means include first and second bit map memories, respectively.

9. A recording data processor according to claim 7 further comprising addressing means for specifying a common address to said first and second storage means.

10. A recording data processor according to claim 7, further comprising first and second shift registers for converting the parallel dot data and color data supplied from said first and second storage means to first and second serial signals, respectively, wherein said first and second recording data output means output said first and second recording data by operating first and second serial signals supplied from said first and second shift registers, respectively.

11. A recording data processor according to claim 7, wherein said first and second recording data output means comprise means for restricting the output of said first and second recording data so that first and second image formed on the basis of said first and second recording data respectively may not be overlapped.

12. A recording data processor comprising:
first storage means for storing recording data;
second storage means for storing color data representing a reproduction color of the recording data, wherein one of said recording data may correspond to a plurality of reproduction colors; and
recording data output means for outputting first recording data corresponding to a first color and second recording data corresponding to a second color based on the recording data output from said first storage means and the color data output from said second storage means, said recording data output means comprising means for restricting the output of said first and second recording data so that first and second images formed on the basis of said first and second recording data respectively are not overlapped.

13. A recording data processor according to claim 12, wherein said second storage means stores the color data for each recording data.

14. A recording data processor according to claim 12, wherein said first and second storage means include first and second bit map memories, respectively.

15. A recording data processor according to claim 14, wherein recording data is dot data, and at least one page of the dot data is stored in said first bit map memory.

16. A recording data processor according to claim 15, further comprising first and second shift registers for converting the parallel dot data and color data supplied from said first and second storage means to first and second serial signals, respectively, wherein said recording data output means outputs said first and second recording data by operating first and second serial signals supplied from said first and second shift registers, respectively.

17. A recording data processor comprising:
first storage means for storing recording data;
generation means for generating first and second print signals based on the recording data outputted from said first storage means, wherein the recording data may represent that images based on the first and second print signals may overlap;
second storage means for storing data representing whether the first and second print signals are to be generated or not by said generation means; and
means for restricting the generation of said first and second print signals on the basis of the data stored in said second storage means so that first and second images formed on the basis of said first and second print signals respectively are not overlapped.

18. A recording data processor according to claim 17, wherein said first and second storage means include first and second bit map memories, respectively.

19. A recording data processor according to claim 18, wherein said recording data is dot data, and at least one page of the dot data is stored in said first bit map memory.

20. A recording data processor according to claim 17, wherein said first print signal corresponds to a first color, said second print signal corresponds to a second color, and the data stored in said second storage means is associated with said first or second color.

21. A recording data processor according to claim 17, further comprising first and second shift registers for converting the parallel recording data and data supplied from said first and second storage means to first and second serial signals, respectively.

* * * * *

UNITED STATES PATENT AND TRADEMARK OFFICE
CERTIFICATE OF CORRECTION

PATENT NO. : 4,905,091
DATED : February 27, 1990
INVENTOR(S) : MASAYOSHI SUZUKI, ET AL.

It is certified that error appears in the above-identified patent and that said Letters Patent is hereby corrected as shown below:

COLUMN 2

Line 16, "CPU 61" should read --CPU 61,--.
    Line 46, "it" should be deleted.

COLUMN 6

Line 56, "claim 2," should read --claim 7,--.

COLUMN 7

Line 7, "image" should read --images--.

Signed and Sealed this

Twenty-sixth Day of March, 1991

*Attest:*

HARRY F. MANBECK, JR.

*Attesting Officer*     *Commissioner of Patents and Trademarks*